US009087326B2

(12) United States Patent
Shea et al.

(10) Patent No.: US 9,087,326 B2
(45) Date of Patent: Jul. 21, 2015

(54) ACCRUING AND/OR PROVIDING DIGITAL CURRENCY FOR MEDIA CONSUMPTION

(75) Inventors: Matthew T. Shea, Mercer Island, WA (US); Alex K. St. John, Redmond, WA (US); Sean W. Vanderdasson, Redmond, WA (US)

(73) Assignee: WILDTANGENT, INC., Redmond, WA (US)

( * ) Notice: Subject to any disclaimer, the term of this patent is extended or adjusted under 35 U.S.C. 154(b) by 2568 days.

(21) Appl. No.: 11/685,063

(22) Filed: Mar. 12, 2007

(65) Prior Publication Data

US 2007/0215690 A1    Sep. 20, 2007

Related U.S. Application Data

(60) Provisional application No. 60/783,527, filed on Mar. 17, 2006, provisional application No. 60/784,299, filed on Mar. 20, 2006, provisional application No. 60/870,276, filed on Dec. 15, 2006.

(51) Int. Cl.
| | | |
|---|---|---|
| *G06Q 20/00* | (2012.01) | |
| *G06Q 20/06* | (2012.01) | |
| *G06Q 20/12* | (2012.01) | |
| *G06Q 30/02* | (2012.01) | |
| *G06Q 40/00* | (2012.01) | |

(52) U.S. Cl.
CPC ............ *G06Q 20/06* (2013.01); *G06Q 20/1235* (2013.01); *G06Q 30/02* (2013.01); *G06Q 40/00* (2013.01)

(58) Field of Classification Search
CPC .................................................... G06Q 20/367
USPC ........................................................... 705/65
See application file for complete search history.

(56) References Cited

U.S. PATENT DOCUMENTS

| | | | |
|---|---|---|---|
| 5,260,999 A | | 11/1993 | Wyman |
| 5,933,811 A | * | 8/1999 | Angles et al. .............. 705/14.56 |
| 6,047,067 A | * | 4/2000 | Rosen ............................ 705/68 |
| 6,212,635 B1 | | 4/2001 | Reardon |
| 6,264,561 B1 | | 7/2001 | Saffari et al. |
| 6,311,214 B1 | | 10/2001 | Rhoads |
| 6,473,794 B1 | | 10/2002 | Guheen et al. |
| 6,606,744 B1 | | 8/2003 | Mikurak |
| 7,200,868 B2 | | 4/2007 | Mattox et al. |
| 7,287,078 B2 | | 10/2007 | Pradhan et al. |
| 7,849,329 B2 | | 12/2010 | Chen et al. |
| 2001/0032115 A1 | | 10/2001 | Goldstein |
| 2001/0034705 A1 | | 10/2001 | Rhoads et al. |

(Continued)

FOREIGN PATENT DOCUMENTS

JP       2002149614 A       5/2002

OTHER PUBLICATIONS

Office Action for U.S. Appl. No. 11/685,073, mailed May 24, 2010.

*Primary Examiner* — James A Reagan
(74) *Attorney, Agent, or Firm* — Schwabe Williamson & Wyatt PC

(57) ABSTRACT

Methods and apparatuses for automatically crediting a user account associated with a user by a certain number of digital tokens if the user account satisfies a condition upon querying the user account. Example conditions include the passage of a certain amount of time, the current date is a pre-determined date, and the number of digital tokens in the user account is below a threshold level among others.

29 Claims, 9 Drawing Sheets

(56) References Cited

U.S. PATENT DOCUMENTS

| | | |
|---|---|---|
| 2002/0002538 A1 | 1/2002 | Ling |
| 2002/0007351 A1 | 1/2002 | Hillegass et al. |
| 2002/0016816 A1 | 2/2002 | Rhoads |
| 2002/0040344 A1 | 4/2002 | Preiser et al. |
| 2002/0073015 A1* | 6/2002 | Chan et al. ............ 705/37 |
| 2002/0111907 A1 | 8/2002 | Ling |
| 2002/0131076 A1 | 9/2002 | Davis |
| 2002/0147638 A1* | 10/2002 | Banerjee et al. ............ 705/14 |
| 2003/0040957 A1 | 2/2003 | Rodriguez et al. |
| 2003/0149662 A1 | 8/2003 | Shore |
| 2003/0177101 A1 | 9/2003 | Ferris |
| 2004/0128514 A1 | 7/2004 | Rhoads |
| 2004/0242325 A1 | 12/2004 | Levitan et al. |
| 2004/0258275 A1 | 12/2004 | Rhoads |
| 2005/0013462 A1 | 1/2005 | Rhoads |
| 2005/0096993 A1 | 5/2005 | Pradhan et al. |
| 2006/0048132 A1 | 3/2006 | Chen et al. |
| 2006/0063587 A1 | 3/2006 | Manzo |
| 2006/0161501 A1* | 7/2006 | Waserstein et al. ............ 705/65 |
| 2007/0004514 A1 | 1/2007 | Walker et al. |
| 2007/0067301 A1 | 3/2007 | Malik |
| 2011/0269533 A1 | 11/2011 | Kelly et al. |

* cited by examiner

ACCRUING AND/OR PROVIDING DIGITAL CURRENCY FOR MEDIA CONSUMPTION

CROSS-REFERENCE TO RELATED APPLICATIONS

The present application claims priority to U.S. Provisional Patent Application No. 60/783,527 filed Mar. 17, 2006 entitled "Multiple Source Digital Currency for Media Consumption Method and Apparatus" the entire disclosure of which is hereby incorporated by reference in its entirety. The present application also claims priority to U.S. Provisional Patent Application No. 60/784,299 filed Mar. 20, 2006 entitled "Offline Token Based Game Playing Method and Apparatus" the entire disclosure of which is hereby incorporated by reference in its entirety. The present application also claims priority to U.S. Provisional Patent Application No. 60/870,276 filed Dec. 15, 2006 entitled "Multiple Source Digital Currency for Media Consumption Method and Apparatus Including a Graphical User Interface" the entire disclosure of which is hereby incorporated by reference in its entirety.

TECHNICAL FIELD

The present application relates to the fields of data processing and media licensing. Specifically, the present application relates to methods and apparatus for the licensing of digital media content using digital currency.

BACKGROUND

As computing devices become more powerful, more non-traditional network capable computing devices are available. Some examples of nontraditional network capable computing devices include application specific devices, such as set top boxes, entertainment personal digital assistants, pagers, text messengers, smart appliances, and wireless mobile phones. Additionally, the availability of the Internet and other networks has created both commercial and noncommercial opportunities for distribution of digital media content to end users all over the world who may not otherwise have access to the same content if it were distributed using traditional means. Thus, the licensing of digital media content has become a vital concern as digital rights holders seek to take advantage of the opportunities to distribute their content, such as games, to users while ensuring that proper licensing of the content is afforded.

DETAILED DESCRIPTION OF THE EMBODIMENTS

Figure 1:
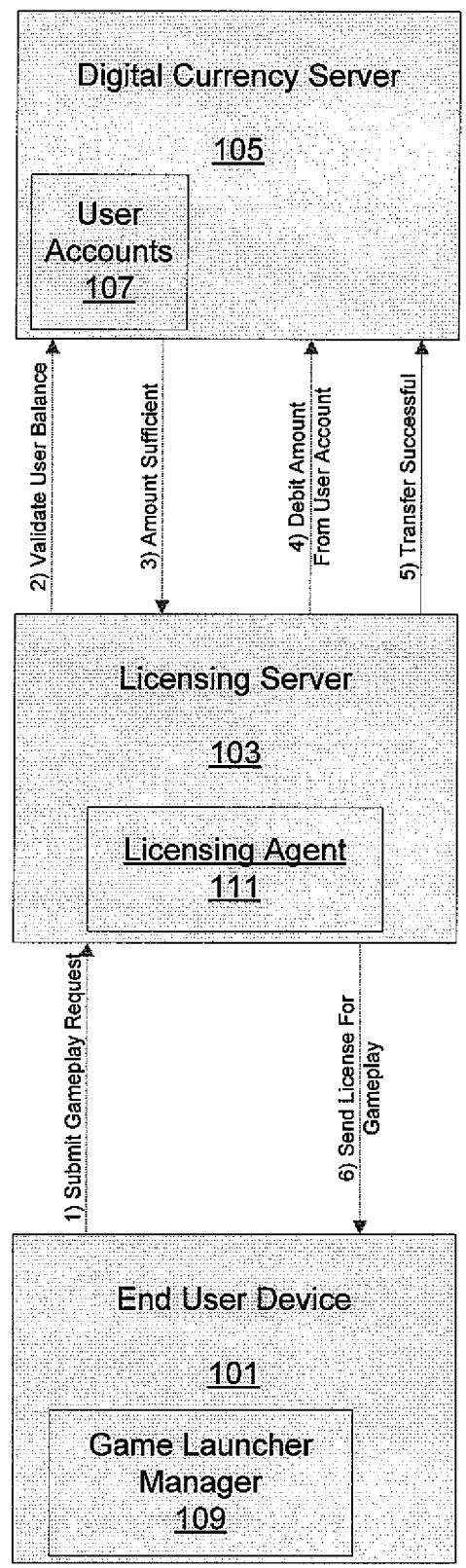
FIG. 1 illustrates an overview of the invention in accordance with various embodiments wherein a licensing server facilitates the licensing of digital media content.

Illustrative embodiments of the present invention include, but are not limited to, the creation of an economy of digital currency and/or tokens hosted on a server accessible via a wide area network such as the Internet. These digital tokens may be used by end users to acquire licenses to access a given media content, e.g., a game, without having to purchase consumption rights for the media content outright. When the non-owner user tenders an appropriate amount of digital currency, the user may be given access to a consumption session, or sessions, of a media, e.g., a game. A "session" is defined as the launching and exit of the playing of the digital media. A session may time out if the user is not actively playing the media or using the computer. Also, in various embodiments, a maximum number of minutes may be set for a session length.

As such, methods and apparatuses for licensing digital media content using digital currency and/or tokens are described. Also, methods and apparatuses for providing and/or acquiring digital currency and/or tokens is described. Additionally, a graphical user interface suitable for practicing embodiments of the present invention is described.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

The description to follow also includes the process by which users may accrue digital currency for them to spend on licenses for media consumption. End users may accrue digital currency from multiple sources. In various embodiments, a game launcher, a license server and a digital currency server may be employed to practice the invention. In various embodiments, the game launcher may be disposed on a user/client device, and the license server and the digital current server may be remotely disposed and coupled to each other and the user/client device via the network. For these embodiments, the invention is practiced while the user/client device is connected to the network. In other embodiments, the license server includes a client side portion disposed on the user/client device, and a server side portion, remotely disposed. The two portions may cooperate to enable an amount of a user's digital currency to be pre-checked out and stored on the user's device, thereby allowing the invention to be practiced with the user/client device being offline.

In the specification and claims that follow, a "digital token" means "a digital record or representation of credit redeemable for goods and/or services including the licensing of digital media content, in various embodiments, such credit having no monetary value once purchased or acquired and redeemable only for such goods and services as determined by the issuer of the credit."

For ease of understanding, the remaining description will be substantially presented in the context of accruing and spending digital tokens for licenses to access games. However, the description is not to be read as limiting on the scope of the invention. As will be readily apparent from the description, the invention may be practiced for licensing access to a wide range of media content, including, but not limited to music and/or video.

Licensing of Digital Media Using Digital Currency

FIG. 1 illustrates a system suitable for practicing various embodiments. End User Device 101 may be a general purpose personal computer, personal data assistant, dedicated game console, etc. End User Device 101 may be communicatively coupled to licensing server 103 which may, in turn be communicatively coupled to Digital Currency Server 105. Licensing server 103 may contain licensing agent 111. In alternative embodiments, licensing agent 111 may reside on Digital Currency Server 105. In embodiments, licensing agent 111 may reside wholly or partially on end user device 101 (see description of FIG. 2). In embodiments, licensing server 103 may be eliminated from the system if licensing agent 111 is housed elsewhere.

Digital tokens may be stored within user accounts 107 stored on digital currency server 105 accessible over a wide area network, e.g., the Internet. A user associated with end user device 101 may have an account 107 stored on digital currency server 105 containing a balance of digital tokens available for the user to spend on licenses for accessing games.

When a user associated with end user device 101 wants to play a game incorporated with the teachings of the invention, game launching manager 109 (hereinafter, simply referred to as "game manager", "launch manager" or "manager") within end user device 101 may submit a request to licensing server 103 and/or licensing agent 111 which may be coupled to end user device 101 via any type of networking and/or communication connection. The request, in various embodiments, may include credentials to identify the user.

Licensing server 103 and/or licensing agent 111, in response to the request, may look up the cost for a session of the game. It may verify with digital currency server 105 that the user has the necessary amount of digital tokens in his/her account and then may instruct digital currency server 105 to debit that number of tokens from the user's account. Subsequently, licensing server 103 and/or licensing agent 111 may issue a working digital license to grant access to the game. On issuance, licensing server 103 and/or licensing agent 111 may transmit the working digital license back to launch manager 109. In embodiments, the license transmitted to launch manager 109 may allow the user to, for example, consume a single session of the game, a certain number of game sessions greater than one, an unlimited number of game sessions during a finite period of time, etc.

In embodiments, launch manager 109 may contain the necessary software and files to run games on end user device 101.

In various embodiments, licensing server 103 and/or licensing agent 111 may differentiate a user's digital tokens by whether the user paid for the digital tokens. Examples of digital tokens the user did not pay for may include but are not limited to free trial digital tokens from a content developer/provider, digital tokens the user "earned" through an affinity program (miles flown with an airline, nights stayed with a hotel, and so forth), and free digital tokens from a sponsor/advertiser. Licensing server 103 and/or licensing agent 111 may debit the required number of tokens from the user's digital tokens he did not pay for, until digital tokens of such type have been exhausted before debiting the user's digital tokens he did pay for. In various embodiments, licensing server 103 and/or licensing agent 111 may further differentiate the digital tokens the user did not pay for. For example, licensing server 103 and/or licensing agent 111 may first instruct digital currency server 105 to debit the user's digital tokens provided by sponsors/advertisers, until digital tokens of such type have been exhausted before debiting other digital tokens the user did not pay for (e.g., digital tokens the user accumulated though affinity programs).

Game launch manager 109, in accordance with the invention, may be equipped to verify that the digital license is authentic, and grant access to the user upon verifying the license. Launch manager 109, in accordance with the license, may configure itself to allow the user to play the game session indefinitely, for a certain amount of time or only while the user is actively using his/her computer. When the user exits the game, the license may be invalidated by game launch manager 109. In that case, the user may need to resubmit another game session request through game launch manager 109 and pay more digital tokens in order to receive another license from license server 103 and/or licensing agent 111 to access and play the game again.

In various embodiments, license server 103 and/or licensing agent 111 may also be equipped to report the various licensing activities to sponsors/advertisers, distributors and/or owners of the games to enable the sponsors/advertisers to pay for the sponsorship and/or advertising, and distributors and/or owners to be compensated, e.g., in situations where the media distributors and/or owners are compensated on a usage basis.

In various embodiments, multiple users may pool their digital tokens stored on digital currency server 105. Examples of such pooling may be a family plan, a group plan or a company plan, where any member of the group may consume content using digital tokens from the pool. In the family plan example, any family member may be allowed to consume content using digital tokens from the family's pooled digital tokens. In various embodiments, while the users' digital tokens may be pooled, each user's usage of the pooled digital tokens may be regulated. For example, a child member of a family plan may be regulated to a configurable consumption rate.

In various embodiments, the spending of digital tokens for consumption of various titles of content may be tracked, and the user may be given credit towards a reduction of the purchase price of a title, proportional to or based at least in part on the amount of digital tokens previously spent for consuming the title.

In various embodiments, game launcher 109 may offer the user a choice of viewing advertising prior to gameplay. If the user chooses to view an advertisement, this may be in lieu of payment of tokens from the user's account. The user may alternatively choose to pay for the session with their tokens and bypass the display of advertisements before, during and/or after the session of play. In alternative embodiments, viewing an advertisement may merely reduce the number of digital tokens required to play the game or consume the digital media.

In various embodiments, game launcher 109 may serve and/or display advertisements to the user during the consumption depending on the state of ownership and/or the nature of the digital tokens being used to "pay" for the consumption. For example, advertisements may be served during content consumption enabled by the usage of digital tokens provided by sponsors and/or advertisers. In embodiments, the advertisements shown may be advertisements of the sponsors or advertisers who provided the tokens only, or complementary ones. In embodiments, the serving of advertisements may be completely disabled if the user owns the content or the content consumption is enabled using digital tokens paid for by the user.

Figure 2:
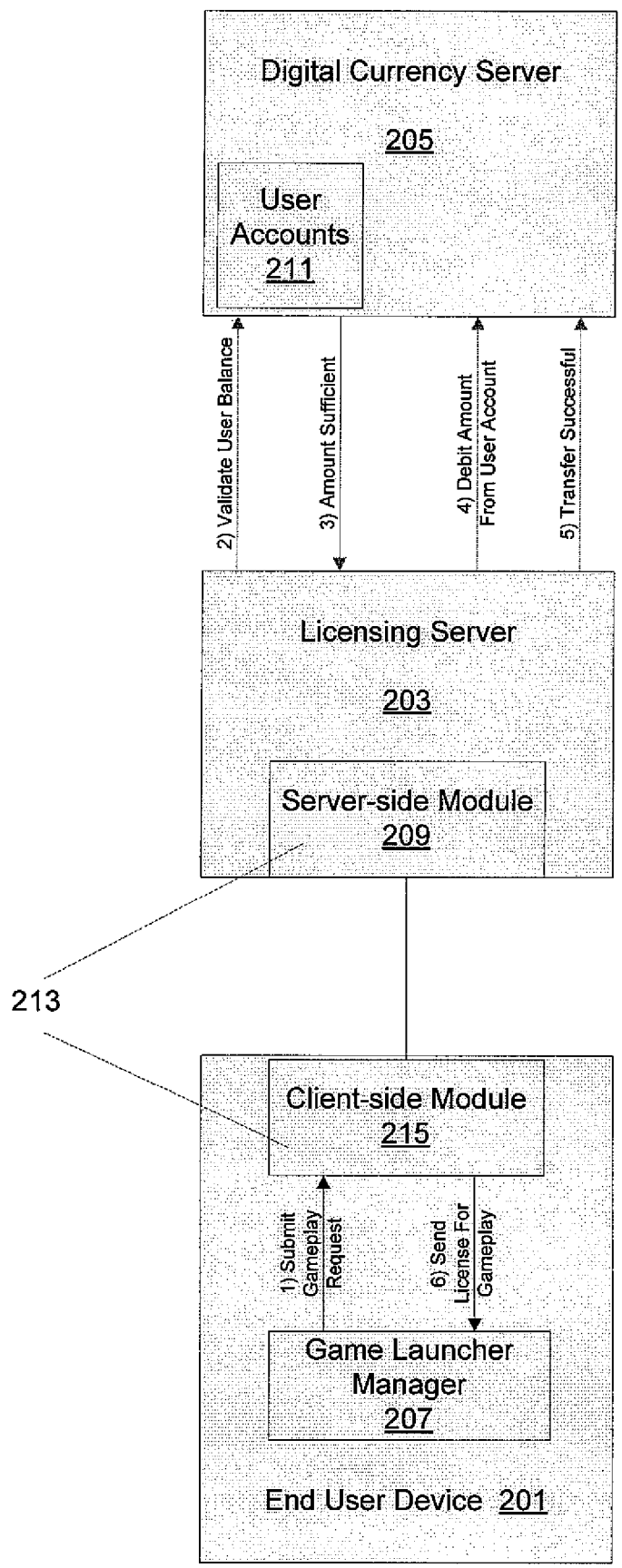
FIG. 2 illustrates a block diagram in accordance with embodiments in which a client device includes a licensing module for communicating with a licensing server to facilitate the licensing of digital media content.

FIG. 2 illustrates various embodiments of the present invention. Similar to FIG. 1, end user device 201 may be communicatively coupled to licensing server 203 which may, in turn, be communicatively coupled to digital currency server 205. End user device 201 may contain game launch manager 207. End user device 201 may contain a client side licensing module 215. In various embodiments, therefore, licensing agent 213 may comprise of at least two portions, client side licensing module 215 disposed on end user device 201, and server side licensing module 209 remotely disposed on licensing server 203.

In embodiments, the two portions may cooperate to enable an amount of a user's digital tokens be cached on end user device 201, thereby enabling a request for a digital license and the tendering of digital tokens be performed while the user/client device is offline or licensing server 203 is otherwise unavailable. In embodiments, users may be able to transfer cached tokens back to digital currency server 205. In other embodiments, users may be unable to transfer cached tokens back to digital currency server 205.

In various embodiments, client side module 215 may be further equipped to monitor to determine whether end user device 201 is online. On determining that it is, client side module 215 may further determine whether the amount of digital tokens cached on end user device 201 has fallen below a predetermined threshold. If the amount of digital tokens cached on end user device 201 is determined to have fallen below the predetermined threshold, client side module 215 may send a pre-request to server side module 209 of license server 203 to pre-check out an amount of the user's digital tokens from digital currency server 205, and re-fill the digital token cache on end user device 201. In other embodiments, client side module 215 may request digital tokens from server side module 209 upon the explicit direction of the user. This request may be made via an interface or process on end user device 201. In embodiments, this interface may be, for example, a graphical user interface or other interface. In embodiments, this interface may be included within game launcher 207.

In various embodiments, client side module 215 of licensing agent 213 may further be adapted to record and track licensing activities while end user device 201 is offline. In embodiments, client side module 215 may be adapted to upload the recorded information to server side module 209 of license server 203 for reporting upon detecting that end user device 201 has been re-connected to the network reestablishing communication to licensing server 203.

In alternative embodiments, server side module 209 of licensing agent 213 may reside on digital currency server 205. In embodiments, server side module 209 may reside on end user device 201 wholly or in part.

Acquiring and/or Providing Digital Currency for Licensing Digital Media

End users, as alluded to earlier, may acquire digital tokens from a variety of sources. In various embodiments, a licensing server may be equipped with payment handling logic to allow the user to purchase tokens via a real world payment mechanism such as, for example, credit card, check, cash or other real world payment mechanism. This purchase may occur via the following example conditions as well as others.

Figure 3:
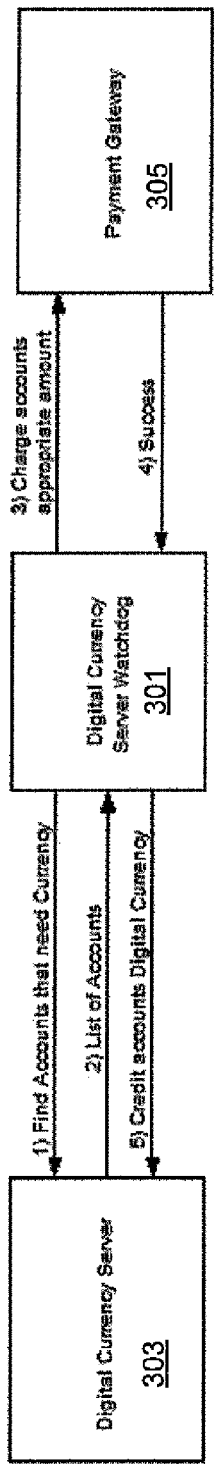
FIG. 3 illustrates a periodic approach to accumulate and/or provide digital tokens in accordance with various embodiments.

Recurring Payment: Every X days (e.g., 30 days), the user is charged $Y dollars to received Z digital tokens in their account On Demand: When a user's account is below a threshold of digital tokens, they are automatically charged $A dollars to receive B digital tokens in their account One Time Purchase: The user pays $F dollars to received G digital tokens in their account FIG. 3 illustrates various embodiments of the present invention including providing end users with digital tokens using the "Recurring Payment" and "On Demand" payment schemes listed above in addition to others. In various embodiments, digital currency server watchdog module 301 disposed within or associated with a licensing server (not shown), may be a software process that automatically runs and monitors the balance of accounts in the digital token system stored on digital currency server 303. Each user account may be credited digital tokens and their payment method on file charged via payment gateway 305. The digital tokens the user receives may timeout and become invalid after a certain amount of time. In embodiments, the digital tokens may be valid indefinitely.

Watchdog 301 may query digital currency server 303 for all accounts that require processing. In response, digital currency server 303 may respond with a list of all such accounts. This list may be created by determining if any of the accounts stored within digital currency server 303 satisfy an account condition. For example, in regards to user accounts identified as recurring payment accounts, the condition to be satisfied may be that the current date is a predetermined date or that a pre-determined amount of time has passed since the most recent processing (such as, for example, between 1 and 40 days, especially 30 days). In embodiments, for accounts identified as on-demand accounts the condition to be satisfied may be that token balances have fallen below a predetermined threshold level. In other embodiments, other conditions may be used and the scope of this disclosure is not meant to be limited in any way by these two example conditions.

Once digital currency server watchdog 301 has the list of accounts that require processing, it may, in turn, send a request to payment gateway 305 to charge each user associated with each of the listed user accounts for payment of a certain amount of real-world currency in exchange for the digital tokens. In embodiments, payment method information may be included with the user account information sent by digital currency server 303. In embodiments, the amount of payment and the number of digital tokens to be credited may be also included in the user account information.

Upon successful charging of the user, payment gateway 305 may report to watchdog 301 that charging was successful. In embodiments, watchdog 301 may authorize digital currency server 303 to credit the processed user accounts with the digital tokens successfully purchased.

In embodiments, watchdog 301 and/or payment gateway 305 may be disposed within digital currency server 303. In embodiments various functions of digital currency server 303 as described may be provided by a licensing server or some other server not shown.

Figure 4:
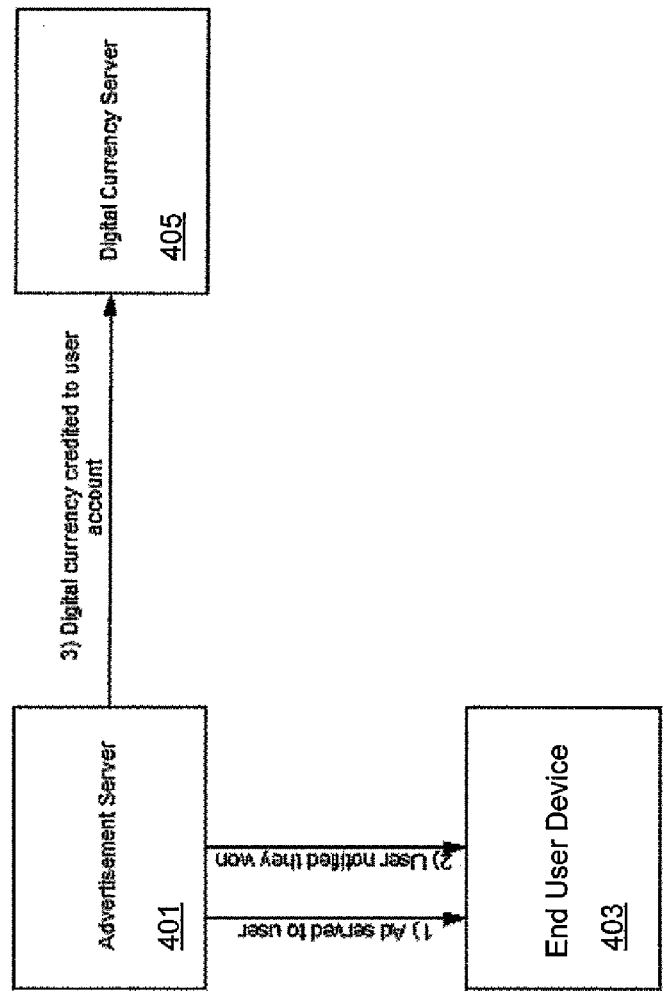
FIG. 4 illustrates an approach to accumulating and/or providing digital tokens in which an advertisement server provides directs a digital currency server to credit a user's account with digital tokens in accordance with embodiments.
Figure 5:
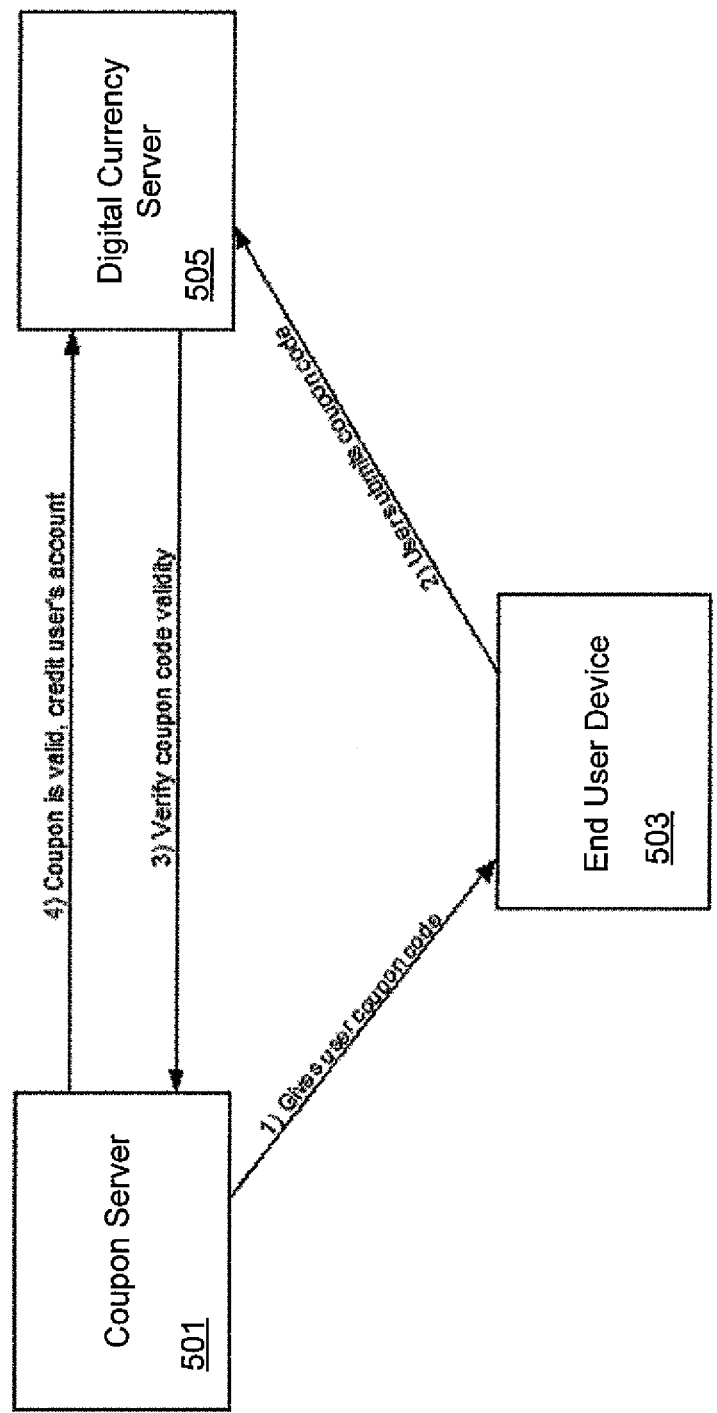
FIG. 5 illustrates a method of accumulating and/or providing digital tokens in which an end user uses a digital coupon to credit his account with digital tokens in accordance with various embodiments.
Figure 6:
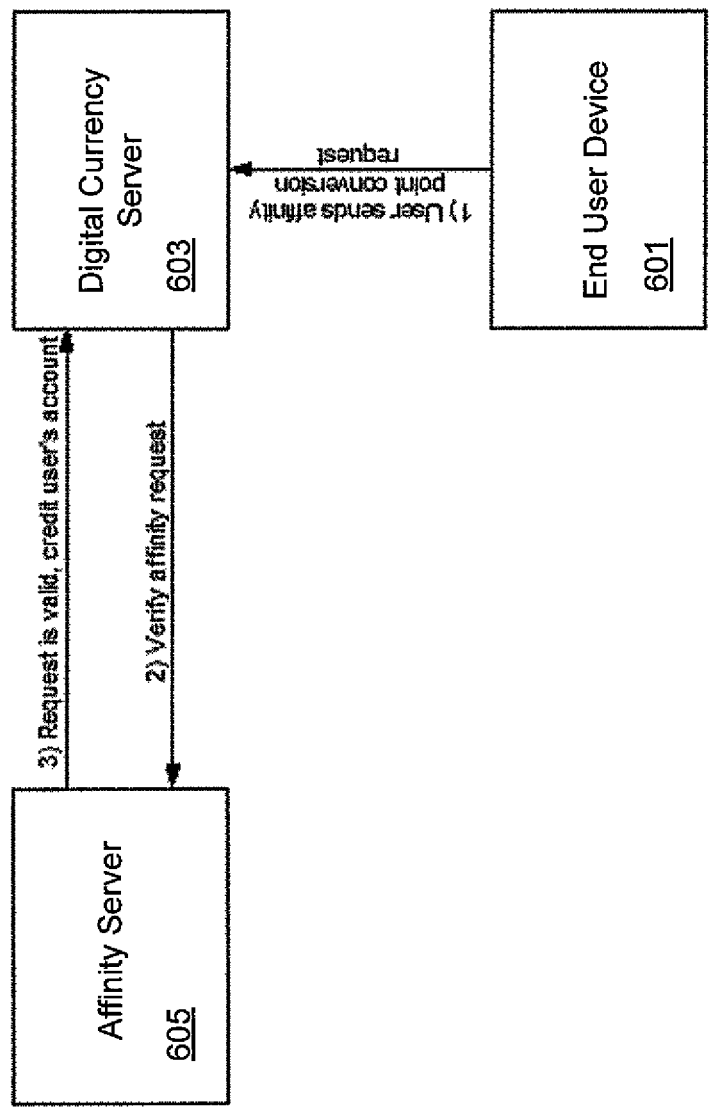
FIG. 6 illustrates a method of accumulating and/or providing digital tokens in which an end user exchanges third party affinity points for digital tokens in accordance with various embodiments.

In various embodiments such as those illustrated in FIGS. 4 through 6, a digital currency server may be equipped such that end users can receive digital tokens without the requirement of payment. In these example situations, as well as others, end users may receive digital tokens via the following example conditions or requirements:

Advertisers: An advertiser may give an end user digital tokens after he/she watches a given ad. An advertiser may give the user a chance to win digital tokens.

Consumer Product Company: A consumer product company may give an end user a code or coupon upon purchasing one of their products. Users may redeem the code or coupon with the Digital Currency Server for digital tokens in their account.

External Affinity System: Users may accrue affinity points with one or more external partners, e.g., an airline, a hotel chain, a car rental company, and may choose to convert the accrued affinity points (e.g., frequent flyer miles, frequent stays) into digital tokens to be credited to their associated user accounts.

FIG. 4 illustrates a system for allowing users a chance to acquire digital tokens by watching an advertisement and entering a contest or random drawing. Advertising server 401 may serve an advertisement via a wide area network, such as the Internet, to end user device 403. Subsequently, advertisement server 401 may notify the user associated with end user device 403 that they have won a certain number of digital tokens. Next, advertisement server 401 may authorize the crediting of digital tokens to a user account associated with the user stored within digital currency server 405.

In various embodiments, digital currency server 405 may be equipped to track the source of a given digital token to a particular advertiser. In embodiments, this information may be used to charge the advertisers. In other embodiments where the digital token was purchased directly by the user, digital currency server 405 may tender appropriate payments to the distributors and/or owners of the game or digital media.

FIG. 5 illustrates a system for allowing users to redeem electronic coupons for digital tokens in accordance with various embodiments. Coupon server 501 may provide a user associated with end user device 503 with a digital coupon or coupon code. The user then may access digital currency server 505 via a user interface, such as for example a graphical user interface or some other interface, and submit the electronic coupon or coupon code. Digital currency server 505 may then submit a query to coupon server 501 to determine if the electronic coupon or coupon code is valid. Coupon server 501 may respond that the electronic coupon or coupon code is valid. If so, then a user account stored within digital currency server 505 may be credited with a certain number of digital tokens. In embodiments, digital currency server 505 may query a device other than coupon server 501 or, in embodiments, a different coupon server than the one that initially provided the user with the electronic coupon or coupon code. In alternate embodiments, digital currency server 505 may contain the appropriate logic to verify the electronic coupon or coupon code.

In embodiments, digital currency server 505 may track the use of digital tokens and report to coupon server 501 whenever a user uses a token acquired through the use of an electronic coupon or coupon code. In this way, digital currency server 505 may facilitate the charging of the entity associated with coupon server 501—which may or may not be associated with the entity associated with digital currency server 505—for the coupon-acquired tokens upon use. In alternate embodiments, digital currency server 505 may facilitate charging for the tokens immediately upon the crediting of the user's account.

FIG. 6 illustrates a system to allow user to exchange affinity points for digital tokens in accordance with various embodiments. An end user associated with end user device 601 may access digital currency server 603 via an interface such as, for example, a graphical user interface or other interface. The end user may then request that affinity points be exchanged for digital tokens. Upon receipt of the end user request, digital currency server 603 may query affinity server 605 to verify that the user's affinity point conversion request is valid. In response, affinity server 605 may verify that the user's request is valid and authorize the crediting of a user account associated with the user and stored on digital currency server 603 with a certain number of digital tokens. In alternate embodiments, digital currency server 603 may contain the appropriate logic to verify the affinity request.

In embodiments, digital currency server 603 may track the use of digital tokens and report to affinity server 605 whenever a user uses a token acquired through the use of affinity points. In this way, digital currency server 603 may facilitate the charging of the entity associated with affinity server 605—which may or may not be associated with the same entity associated with digital currency server 603—for the affinity-acquired tokens upon use. In alternate embodiments, digital currency server 603 may facilitate charging for the tokens immediately upon the crediting of the user's account.

In various embodiments such as those depicted in FIGS. 5 and 6, end users may access digital currency server 505 and/or digital currency server 603 via an intermediary device such as, for example, a web server, or other device communicatively coupled to digital currency server 505 and/or digital currency server 603.

Graphical User Interface

Figure 7:
FIG. 7 illustrates a graphical user interface suitable for practicing the invention, in accordance with various embodiments.
Figure 8:
FIG. 8 illustrates a graphical user interface suitable for practicing the invention in which the user is provided visual feedback in accordance with various embodiments.
Figure 9:
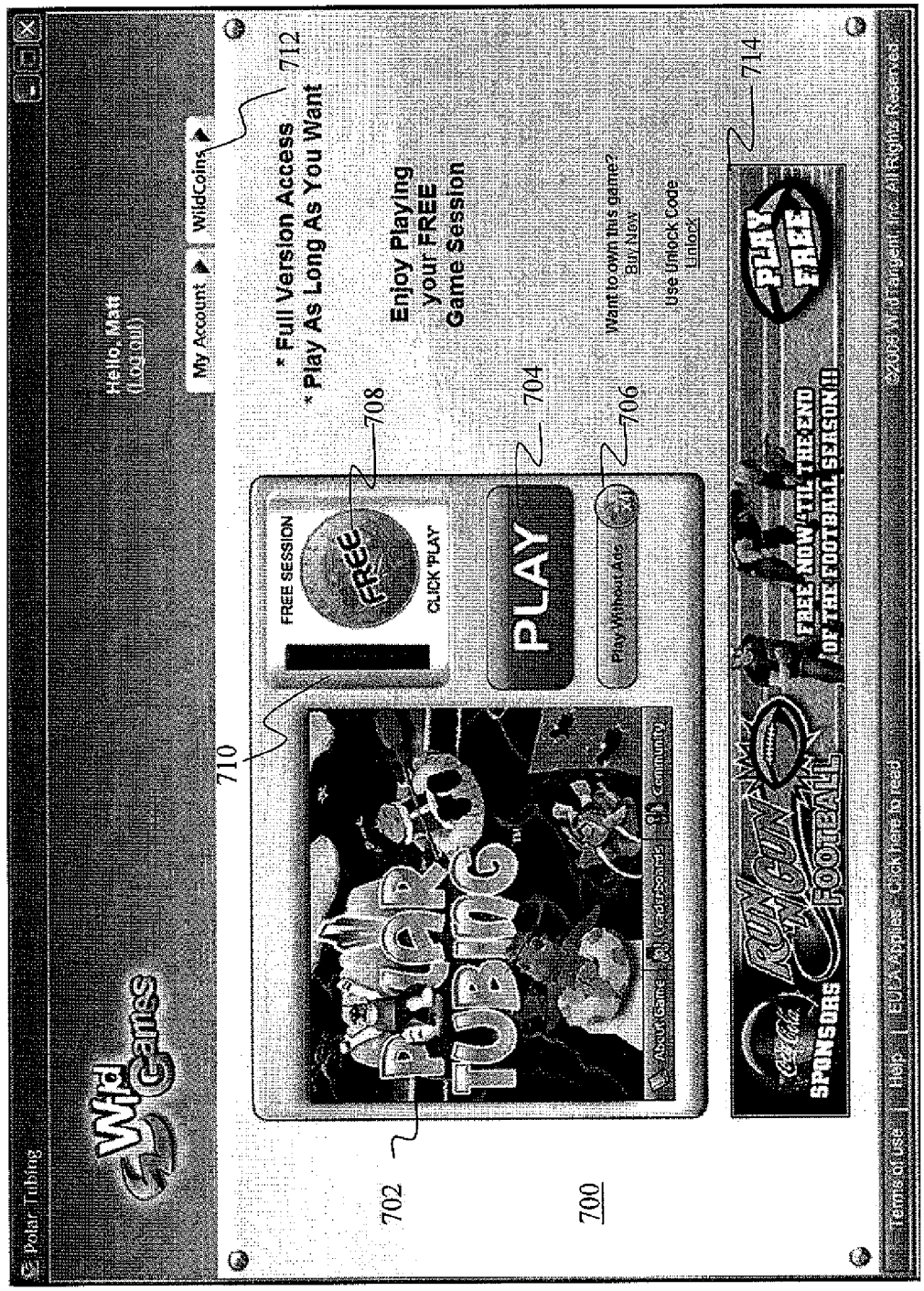
FIG. 9 illustrates an alternative graphical user interface suitable for practicing the invention in accordance with embodiments.

FIGS. 7-9 illustrate various exemplary graphical user interface (GUI) views suitable for practicing the invention, in accordance with various embodiments. As illustrated, for the embodiments, graphical user interface 700 may include display region 702 for displaying game titles available for play.

Display region 702 may also include graphics such as static images and/or video files to entice the user. GUI 700 may also support audio to accompany the graphics. A game title may also have associated with it "links" to learn more about the game ("About Game"), who are the current leaders and their scores ("Leaderboards"), and information about or associated with a community ("Community").

Further, for the embodiments, graphical user interface 700 may include a number of control buttons, such as control button 704 for initiating gameplay of a selected game and exit button 706. To improve user experience, graphical user interface 700 of the embodiments may also include a coin icon 708 and slot image 710 for facilitating animation of the consumption of digital tokens of the present invention for game play. In embodiments, two control buttons may be provided; the first may allow the user to play the game without displayed advertisements in exchange for digital tokens while the second button may allow the user to play the game for free but with the display of advertisements during gameplay. In embodiments two buttons may be provided, but no free gameplay option is available; in these embodiments, selection of either button may have the same effect.

As described earlier, embodiments of the present invention allow for digital tokens to be purchased by the user or accrued by other means, including but not limited to, digital tokens provided by sponsors or advertisers. For the embodiments, coin icon 708 is either unlabeled (FIG. 7-8) to depict that playing of a selected title will consume a number of digital tokens, or labeled "Free" (FIG. 9) to depict that playing of a selected title will not consume any digital token. In embodiments, a label may be provided to indicate the number of digital tokens required to license the content. In other embodiments, the label may additionally depict the type of digital token will be consumed such as, for example, tokens acquired from advertisers and/or affinity partners, and other types. In embodiments, coin icon 708 may be customized to indicate an advertiser and/or affinity partner. Such customization may include, for example, an advertiser's logo. In still other embodiments, the different types of earlier described digital tokens may be differentiated by other means.

FIG. 8 illustrates a GUI view wherein coin icon 708 may be shown being inserted into slot 710. Upon selection of play button 704, software logic may cause a sequence of successive displays to move coin icon 708 into slot image 710 to animate the dropping of one or more of coins 708 into a slot, to provide feedback to the user upon the granting of access to the digital media content and/or consumption of the user's digital tokens. In embodiments, such feedback may be provided even if the content is provided to the user for free and/or if the user is granted access without exchanging digital tokens. In various embodiments, the coin dropping animation may also be supplemented with the playing of an audio file having, for example, the sound of coin dropping or other audio file. The length of the animation and/or the number of coins dropped may be proportional, linearly or non-linearly, to the number of digital tokens consumed for a particular game play selection.

For the embodiments, game display region 702, play button 704, coin icon 708 and slot image 710 may be proximally disposed adjacent to each other as shown, on a common "tab". For the embodiments, an "exit" button 706 may also be provided to facilitate user exit from game selection and play initiation.

For the embodiments, advertisements may be rendered at a lower display region 714. Further, tab 712 may be provided to take the user to a different set of end user interfaces to manage the digital token account or otherwise replenish their digital tokens.

Resultantly, user experience with game or other digital media consumption involving digital token of the present invention may be enhanced.

Exemplary Computer System

Figure 10:
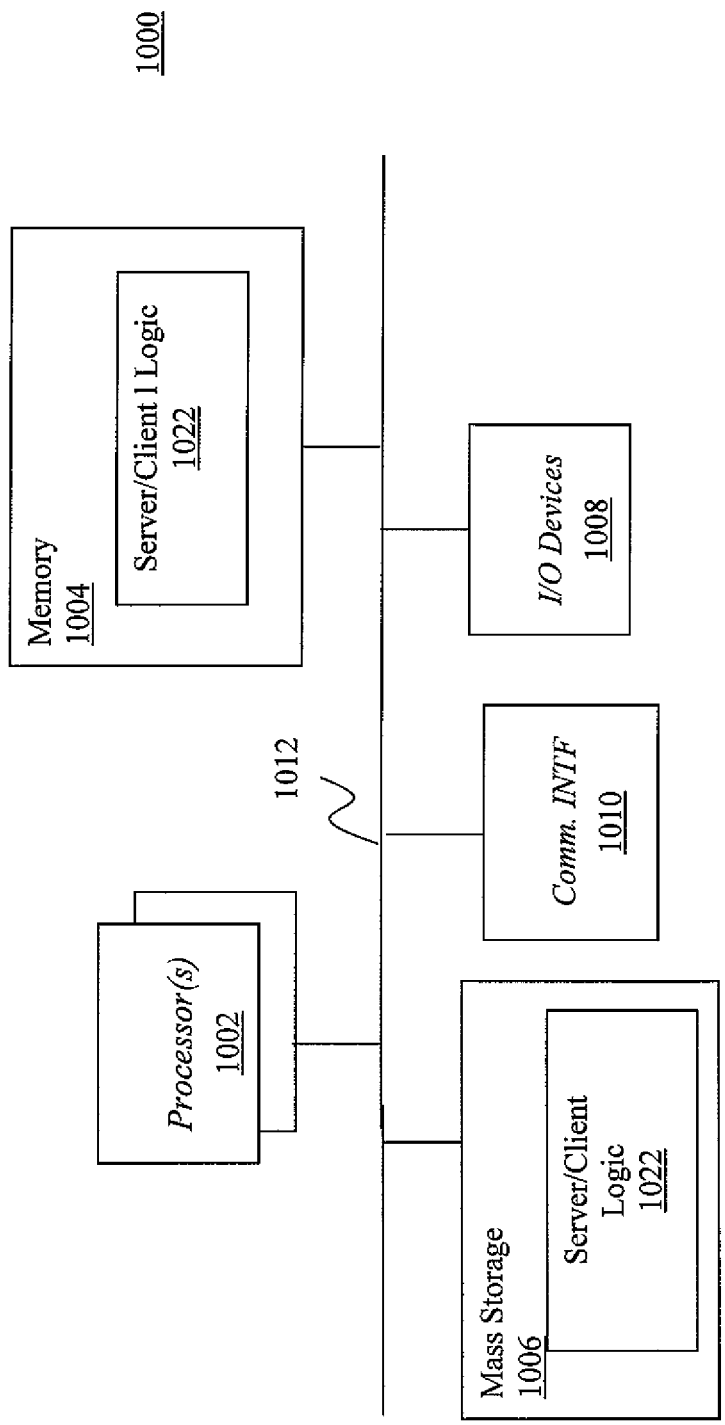
FIG. 10 illustrates an example computing system suitable for use as digital currency server, licensing server and/or a host computer hosting the game launch manager, in accordance with various embodiments.

FIG. 10 illustrates an example computing system/device suitable for use to practice the client device (end user device) and/or any of the servers depicted in any of FIGS. 1-6 or described in the accompanying text in accordance with one embodiment. As shown, computing system/device 1000 may include one or more processors 1002, and system memory 1004. Additionally, computing system/device 1000 may include mass storage devices 1006 (such as diskette, hard drive, CDROM and so forth), input/output devices 1008 (such as keyboard, cursor control and so forth) and communication interfaces 1010 (such as network interface cards, modems and so forth). The elements may be coupled to each other via system bus 1012 which represents one or more buses. In the case of multiple buses, they may be bridged by one or more bus bridges (not shown).

Each of these elements performs its conventional functions known in the art. In particular, system memory 1004 and mass storage 1006 may be employed to store a working copy and a permanent copy of the programming instructions implementing one or more aspects of the above described teachings to practice the present invention. The programming instructions may also implement other related functions. For example, in the case of computing system/device 1000 being used as an end user device 101 of FIG. 1, the programming instructions may also implement telephony, PIM applications and so forth. When computing system/device 1000 is being used as a server, the programming instructions may also implement accounting and other advertisement services related functions. The programming instructions may be implemented in assembler instructions supported by processor(s) 1002 or high level languages, such as C or Java, that may be compiled into such instructions, or instructions for a virtual machine (VM) operating on the processor(s), memory, and software systems of the computing system/device.

The permanent copy of the programming instructions may be placed into permanent storage 1006 in the factory, or in the field, through, e.g., a distribution medium (not shown) or through communication interface 1010 (from a distribution server (not shown)). The constitution of these elements 1002-1012 are known, and accordingly will not be further described.

Although specific embodiments have been illustrated and described herein for purposes of description of the preferred embodiment, it will be appreciated by those of ordinary skill in the art that a wide variety of alternate and/or equivalent implementations may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein.

What is claimed is:
1. A method comprising:
   in response to a request sent to a digital currency server by a digital currency server watchdog module, querying a user account associated with a user, by the digital cur- rency server, to determine if a condition regarding the user account is satisfied; and automatically crediting the user account with one or more digital tokens, by the digital currency server, if the condition is satisfied;

wherein the one or more digital tokens comprise a digital record or representation of credit redeemable for licensing of digital media content.

2. The method of claim 1 wherein the condition is a selected one of a passage of a predetermined amount of time, a quantity of digital tokens in the user account falling below a threshold level, or a current date is a predetermined date.

3. The method of claim 1 further comprising the digital currency server automatically charging the user associated with the user account an amount of money if the condition is satisfied and wherein the automatic crediting occurs only if the automatic charging is successful.

4. The method of claim 3 wherein the crediting is in response to a notification from the digital currency server watchdog module that a payment for the one or more digital tokens has been successfully charged to the user associated with the user account.

5. The method of claim 3 wherein the automatic charging comprises the digital currency watchdog module sending a charge request to a payment gateway and receiving, in response, notification from the payment gateway of whether the charge was successful.

6. The method of claim 1 wherein the user account is one of a plurality of user accounts stored on the digital currency server.

7. The method of claim 1 wherein said request includes a list of user accounts that require processing.

8. The method of claim 7 further comprising the digital currency server responding with the list of user accounts that require processing including at least the user account if the condition regarding the user account is satisfied.

9. The method of claim 8 further comprising the digital currency watchdog module sending a charge request to a payment gateway for each user account on the list.

10. A method comprising:
determining, or receiving notification by a digital currency server a notification indicating whether a user account associated with a user satisfies a requirement; and
automatically crediting by the digital currency server the user account associated with the user with one or more digital tokens if the user satisfies a requirement;
wherein the one or more digital tokens comprise a digital record or representation of credit redeemable for licensing of digital media content.

11. The method of claim 10 wherein the requirement includes a selected one of viewing an advertisement or winning a contest.

12. The method of claim 10 wherein the crediting includes receiving from an advertisement server, by the digital currency server, a request to credit the user account.

13. A method comprising:
receiving by a digital currency server an electronic request for digital tokens from a user associated with a user account, the request including payment information;
verifying or causing to be verified, by the digital currency server the payment information; and
crediting by the digital currency server the user account associated with the user by one or more digital tokens if the payment information is verified;
wherein the one or more digital tokens have no monetary value once credited to the user account and comprise a digital record or representation of credit redeemable for licensing of digital media content.

14. The method of claim 13 wherein the payment information comprises a selected one of a credit card information, an electronic coupon code, a bank account information, a third party affinity program identification, or an online payment account identification.

15. The method of claim 13 wherein the verifying is performed by the digital currency server.

16. The method of claim 15 wherein the third party server initially provides the user with the payment information.

17. The method of claim 15 wherein the verifying is performed by a third party server and said verifying is in response to a request sent to the third party server by the digital currency server.

18. The method of claim 17 wherein the verifying further comprises sending, by the third party server, a notification to the digital currency server indicating whether the payment information is valid.

19. A digital currency server comprising:
a permanent storage device; and
a plurality of programming instructions stored on the permanent storage device and adapted to program the digital currency server to:
in response to a request sent to the digital currency server by a digital currency server watchdog module, query a user account associated with a user to determine if a condition regarding the user account is satisfied; and
automatically credit the user account with one or more digital tokens if the condition is satisfied;
wherein the one or more digital tokens comprise a digital record or representation of credit redeemable for licensing of digital media content.

20. The digital currency server of claim 19 wherein the condition is a selected one of a passage of a predetermined amount of time, the quantity of digital tokens in the user account falling below a threshold level, or the current date is a predetermined date.

21. The digital currency server of claim 19 wherein the plurality of programming instructions are further adapted to program the digital currency server to automatically charge the user associated with the user account an amount of money if the condition is satisfied and to automatically credit the user account only if the automatic charging is successful.

22. The digital currency server of claim 21 wherein the user account is one of a plurality of user accounts stored on the permanent storage device.

23. The digital currency server of claim 22, wherein said request includes a list of user accounts that require processing.

24. The digital currency server of claim 23 wherein the plurality of programming instructions are further adapted to program the digital currency server to respond to the request with the list of user accounts that require processing including at least the user account if the condition regarding the user account is satisfied.

25. The digital currency server of claim 23 wherein the digital currency server watchdog module is stored on the permanent storage device as a second plurality of programming instructions.

26. A digital currency server comprising:
a permanent storage device; and
a plurality of programming instructions stored within the permanent storage device and adapted to program the digital currency server to perform a selected one of:
(1) determine, or receive a notification indicating, whether a user account associated with a user satisfies a requirement, and automatically credit, by the digital currency server, the user account associated with the user with one or more digital tokens if the user satisfies a requirement; or (2) receive an electronic request for digital tokens from a user associated with a user account, the request including payment information, then verify or cause to be verified the payment information, and credit the user account associated with the user by one or more digital tokens if the payment information is verified;

wherein the one or more digital tokens comprise a digital record or representation of credit redeemable for licensing of digital media content.

27. The digital currency server of claim 26 wherein the requirement includes a selected one of viewing an advertisement or winning a contest.

28. The digital currency server of claim 26 wherein the payment information comprises a selected one of a credit card information, an electronic coupon code, a bank account information, a third party affinity program identification, or an online payment account information.

29. The digital currency server of claim 28 wherein a third party server initially provides the user with the payment information.

* * * * *